US012624971B2

(12) United States Patent
    Russell

(10) Patent No.: US 12,624,971 B2
(45) Date of Patent: May 12, 2026

(54) OPTICAL MEASUREMENT SYSTEM

(71) Applicant: Sintela Limited, Lodway (GB)

(72) Inventor: Stuart J. Russell, Lodway (GB)

(73) Assignee: Sintela Limited, Lodway (GB)

( * ) Notice: Subject to any disclaimer, the term of this patent is extended or adjusted under 35 U.S.C. 154(b) by 0 days.

(21) Appl. No.: 19/131,101

(22) PCT Filed: Dec. 15, 2023

(86) PCT No.: PCT/EP2023/086159
    § 371 (c)(1),
    (2) Date: May 19, 2025

(87) PCT Pub. No.: WO2024/132969
    PCT Pub. Date: Jun. 27, 2024

(65) Prior Publication Data
    US 2026/0009659 A1      Jan. 8, 2026

(30) Foreign Application Priority Data

Dec. 21, 2022    (GB) ...................................... 2219449

(51) Int. Cl.
    *G01D 5/353*            (2006.01)
(52) U.S. Cl.
    CPC ................................ *G01D 5/35354* (2013.01)
(58) Field of Classification Search
    CPC .... H04B 10/61; H04B 10/614; H04B 10/616;
              H04B 10/071; G01D 5/266; G01D
              5/35361; G01D 5/35354; G01B 9/02;
                                              G01J 3/45
    See application file for complete search history.

(56) References Cited

U.S. PATENT DOCUMENTS 7,075,659 B2 * 7/2006 Szafraniec ........... G01M 11/333
                                                        356/73.1
8,948,614 B1 * 2/2015 Schmidt ............... H04B 10/616
                                                        398/208
                    (Continued)

FOREIGN PATENT DOCUMENTS

CN          115371714 A      11/2022
EP             3309979 A1 *   4/2018   ........... G02B 6/4292
                    (Continued)

OTHER PUBLICATIONS

International Search Report and Written Opinion for corresponding PCT Application No. PCT/EP2023/086159 dated Mar. 15, 2024 (10 pages).
                    (Continued)

*Primary Examiner* — Abdullahi Nur
(74) *Attorney, Agent, or Firm* — Leason Ellis LLP

(57) ABSTRACT

An optical measurement system in which a coherent light source generates a light signal, and a launch stage receives the light signal from the light source and generates a test signal. The test signal is launched along an optical path. The launch stage includes a first IQ modulator for controlling the test signal. The optical measurement system further includes a local oscillator stage configured to generate a local oscillator signal, wherein local oscillator stage has a second IQ modulator for controlling the local oscillator signal. A detector stage of the system is configured to receive the local oscillator signal from the local oscillator stage and a scattered signal from the optical path, and interfere the local oscillator signal with the scattered signal. The optical measurement system is implemented with one or more photonic integrated circuits.

16 Claims, 4 Drawing Sheets

(56)             References Cited

U.S. PATENT DOCUMENTS

| | | | |
|---|---|---|---|
| 2006/0238770 A1 * | 10/2006 | Szafraniec | G01M 11/337 |
| | | | 356/477 |
| 2012/0008951 A1 * | 1/2012 | Mikami | H04B 10/613 |
| | | | 359/325 |
| 2014/0199063 A1 | 7/2014 | Kaneda | |
| 2020/0225079 A1 | 7/2020 | Cedilnik | |
| 2021/0133614 A1 * | 5/2021 | Ashrafi | G02F 3/00 |

FOREIGN PATENT DOCUMENTS

| | | | | |
|---|---|---|---|---|
| GB | 2588177 A | 4/2021 | | |
| GB | 2606868 A1 | 11/2022 | | |
| GB | 2609641 A | 2/2023 | | |
| GB | 2610643 A | 3/2023 | | |
| WO | WO-2016099565 A1 * | 6/2016 | | H04L 9/0852 |

OTHER PUBLICATIONS

Yan Yaxi et al: "Distributed Optical Fiber Sensing Assisted by Optical Communication Techniques", Journal of Lightwave Technology, IEEE, USA, vol. 39, No. 12, Feb. 2021, pp. 3654-3670.
Schindler PC et al: "Ultra-Dense, Single-Wavelength OFT-Spread OFDMA PON With Laserless 1.2 GB/s ONU Ready for Silicon Photonics Integration", Journal of Lightwave Technology, IEEE, USA, vol. 33, No. 8, Apr. 2015, pp. 1650-1659.
Search Report for corresponding GB Application No. GB2219449.2 dated Jul. 12, 2023 (4 pages).

* cited by examiner

OPTICAL MEASUREMENT SYSTEM

CROSS-REFERENCE TO RELATED APPLICATIONS

This application is a U.S. National Stage Application under 35 U.S.C. § 371 of International Patent Application No. PCT/EP2023/086159, filed Dec. 15, 2023, which claims priority to Great Britain Patent Application No. 2219449.2, filed Dec. 21, 2022, the contents of which are hereby incorporated by reference in their respective entireties.

TECHNICAL FIELD

The invention relates to an optical measurement system, for performing measurements on an optical path such as an optical fibre.

BACKGROUND TO THE INVENTION

There exist various techniques for measuring properties of an optical fibre by interrogating the optical fiber with a transmitted optical signal. These techniques make use of different scattering mechanisms within the optical fibre.
Distributed Acoustic Sensing Distributed Acoustic Sensing (DAS) is an established technology with several commercial systems available. In these systems, a pulse or pulses of laser light are launched into a length of optical fibre and the light that is scattered within the fibre is analysed in order to derive the nature of the acoustic environment, i.e. any physical vibrations, of the fibre transducer. In particular, these systems typically make a measurement of the acoustic strain environment of an optical fibre transducer using an optical time domain reflectometer (OTDR) approach. This gives a differential strain measurement as a function of position along the optical fibre.

As an optical fibre is manufactured it is cooled or quenched from a high temperature as it is drawn. This process leads to the presence of small variations in the density of the optical fibre. These tiny variations in density equate to variations in the effective refractive index of the fibre. These discontinuities lead to scattering of laser light passing through the optical fibre, particularly by Rayleigh scattering. The amplitude of the scattering follows a Rayleigh distribution, but the phase angle of the scattering is uniformly distributed around a unit circle, i.e. $-\pi \leq \Phi \leq \pi$ where $\Phi$ is the phase angle.

Rayleigh scattering is an elastic scattering mechanism, such that the frequency of the scattered light is the same as the pulse of laser light used to probe the optical fibre. However, since the probe pulse is highly coherent, the scattered light interferes with itself as it scatters along the optical fibre. The bandwidth required to detect and fully utilise the Rayleigh scatter for DAS sensing is inversely proportional to the pulse duration. For typical applications, this bandwidth is of the order of 30 MHz to 200 MHZ.
Distributed Strain and Temperature Sensing Distributed Strain and Temperature Sensing (DSTS) is a technique that enables simultaneous measurement of temperature and strain in an optical fibre, using a laser pulse which is transmitted along the optical fibre. The scattering mechanism of interest for DSTS is Brillouin scattering. Brillouin scattering is an inelastic scattering process which is due to photons interacting with and scattering from acoustic band phonons created by the lattice vibrations of the fibre material. The photons may be scattered to a lower energy state (e.g. with the emission of an optical phonon) which is termed Stokes scattering, or the photons may scatter to a higher energy state (e.g. by absorbing energy from a phonon) which is termed anti-Stokes scattering. The shift in signal frequency caused by Brillouin frequency is typically at around 10 to 11 GHz.

The amplitudes of the Stokes and Anti-Stokes components for Brillouin scattering are approximately equal, at least in the spontaneous domain. At higher launch powers, Brillouin scattering can be stimulated whereby the Stokes component is amplified relative to the Anti-Stokes. Since this scattering is related to lattice vibrations, both the Stokes shift and the spontaneous amplitude of the Stokes and Anti-Stokes emission are related to the strain experienced by the fibre and the absolute temperature of the fibre. Signals related to temperature and strain of the optical fibre can be separated by measuring the frequency and amplitude of the Anti-Stokes emission.

SUMMARY OF THE INVENTION

At its most general, the present invention provides an optical measurement system which can be used to perform various different types of optical measurements such as DAS and/or DSTS on an optical path (e.g. an optical fibre). In other words, a single optical setup can be used to perform different types of optical measurements. This is achieved by providing an optical measurement system with a light source, a launch stage configured to receive a light signal from the light source and generate a test signal, and a local oscillator stage for generating a local oscillator signal, each of the launch stage and the local oscillator stage comprising a respective IQ modulator. The IQ modulators in the launch stage and the local oscillator stage provide a high level of control over the test signal and local oscillator signals, enabling a variety of different optical measurements to be implemented. In particular, by controlling the IQ modulators, the test signal and local oscillator signal can be tailored for a desired type of measurement. In this manner, multiple different types of optical measurements can be performed with the same optical measurement system, simply by adapting the manner in which the IQ modulators are controlled and modifying the signal processing of the detected signal, but without having to otherwise modify the optical setup and system hardware. For example, the inventors have found that the optical measurement system of the invention can be used to perform DAS and DSTS measurements on a same optical path (either separately or simultaneously). This also enables both OTDR and optical frequency domain reflectometry (OFDR) techniques to be performed using the same optical measurement system.

Using a single measurement system for implementing different measurement techniques may reduce an amount and cost of hardware which is required for performing the measurements. In particular, sharing the same optical setup between multiple measurement techniques may avoid redundancy in the equipment needed for the different techniques. The measurement system of the invention may also provide an increased degree of flexibility. For example, the system of the invention may enable a user to implement different measurement techniques on the fly by updating how the IQ modulators are controlled, without otherwise having to modify the optical setup.

According to a first aspect of the invention, there is provided an optical measurement system comprising: a coherent light source configured to generate a light signal; a launch stage configured to receive the light signal from the light source and generate a test signal and launch the test signal along an optical path, wherein the launch stage includes a first IQ modulator for controlling the test signal; a local oscillator stage configured to generate a local oscillator signal, wherein local oscillator stage comprises a second IQ modulator for controlling the local oscillator signal; and a detector stage configured to receive the local oscillator signal from the local oscillator stage and a scattered signal from the optical path, and interfere the local oscillator signal with the scattered signal; wherein the optical measurement system is implemented with one or more photonic integrated circuits.

The coherent light source may be a laser or other suitable narrow linewidth source. The light signal corresponds to light that is emitted by the light source. The light signal may also be referred to as a carrier signal. The light source may be configured to emit a continuous wave of coherent light. The light source may be a low Relative Intensity Noise (RIN), narrow linewidth, low phase noise laser designed for general sensing applications.

The launch stage is configured to generate the test signal in response to receiving the light signal from the light source. Thus, the launch stage may be coupled to the light source, to receive at least a portion of the light signal generated by the light source. The launch stage includes the first IQ modulator, which may be configured to generate the test signal based on the received light signal from the light source.

Herein, an IQ modulator may refer to any suitable device (or system) that enables independent control of an amplitude and phase of both the In-phase (I) and Quadrature (Q) components of a complex signal. In this manner, the IQ modulator may enable a desired complex field to be obtained by controlling the I and Q components of the signal over time. Thus, an IQ modulator can be used to generate a pulsed signal (e.g. by controlling amplitude of the signal as a function of time), as well as control a phase, frequency and amplitude of the signal.

The first IQ modulator thus enables control of a variety of parameters for the test signal. In this manner, the first IQ modulator can be controlled to generate a test signal having characteristics that are suited to a type of measurement to be performed. For example, characteristics such as a pulse duration, amplitude, phase and frequency of the test signal can be controlled by controlling the first IQ modulator.

In some cases, the test signal generated by the first IQ modulator may be a pulsed test signal. Using a pulsed test signal may, for example, enable OTDR techniques to be performed. Where a pulsed test signal is used, the pulse duration may be set based on various considerations, such as a length of the optical path and a desired measurement resolution. As an example, the pulsed test signal may have a duration between 5 ns and 100 ns, but need not be limited to this range. As noted above, the first IQ modulator can be configured to generate the pulsed test signal. Alternatively, the launch stage may comprise a separate pulse generator (e.g. connected to the first IQ modulator) which is arranged to pulse the test signal. Any suitable pulse generator may be used, such as an acousto-optic modulator (AOM) or an electro-optic modulator (EOM).

In other cases, the test signal generated by the first IQ modulator may be a continuous wave or quasi-continuous wave test 25 signal (i.e. the test signal may be non-pulsed). Use of such a continuous or quasi-continuous wave test signal may enable the system to be used for performing other measurement techniques, such as OFDR.

The first IQ modulator (and pulse generator, if present), can be controlled to control if the test signal is pulsed or not, and if so to control the pulse duration.

The launch stage is further configured to launch the test signal along the optical path. Thus, an output of the launch stage may be connectable (or connected) to the optical path, so that the test signal can be transmitted to the optical path. For example, the launch stage may comprise a connector for connecting the output of the launch stage to the optical path.

The optical path may comprise an optical fibre. As discussed above, the optical fibre may act as a transducer for DAS and DSTS measurements. In some cases, the optical path (e.g. optical fibre) may form part of the optical measurement system.

The local oscillator stage is configured to generate the local oscillator signal. The second IQ modulator in the local oscillator stage is configured to control the local oscillator signal. Thus, in line with the discussion above, the second IQ modulator can be used to control an amplitude, phase and frequency of the local oscillator signal. The second IQ modulator can also be used to pulse the local oscillator signal, if wanted. Additionally or alternatively, the local oscillator stage can include a pulse generator (e.g. an AOM or EOM) for pulsing the local oscillator signal.

In some cases, the local oscillator stage may be configured to receive the light signal from the light source. In this manner the local oscillator stage may generate the local oscillator signal based on the received light signal, e.g. the second IQ modulator may generate the local oscillator signal from the received light signal. In such as case, light emitted by the light source may be split (e.g. by a beam-splitter), such that a first portion of the light is conveyed to the launch stage and a second portion of the light is conveyed to the local oscillator stage. In other words, the light source may be coupled to the launch stage and the local oscillator stage via a beam-splitter, such that the light signal is received at both the launch stage and the local oscillator stage.

Alternatively, a separate light source may be used by the local oscillator stage for generating the local oscillator signal.

The optical path (e.g. optical fibre) may include a plurality of scattering sites distributed along the length of the optical path, e.g. caused by variations in refractive index along the length of the optical path. When the test signal travels along the optical path (e.g. optical fibre), light in the test signal may be scattered at various locations (i.e. at the scattering sites) along the length of the optical path. For example, light in the test signal may be backscattered via Rayleigh scattering and/or by Brillouin scattering of the test signal at various locations along the length of the optical path. Scattering of light in the test signal at a location along the optical path may result in a scattered signal associated with that location. Thus, for example, a pulse of the test signal travelling along the optical path may result in a plurality of scattered signals, each scattered signal having been scattered at a respective location (i.e. scattering site) along the optical path. The scattered signals may be guided back along the optical path, such that they are received by the detector stage.

The optical path (e.g. optical fibre) may be subjected to different conditions at locations along the optical path, such as acoustic modulations and/or temperature changes. Such variations in conditions along the optical path may cause changes in the scattering of the test signal, e.g. due to local variations in refractive index and length of the optical path.

The location on the optical path at which the scattered signal was scattered may be determined based on a time of receipt of the scattered signal at the detector stage. For example, the location on the optical path may be determined by comparing a time at which a pulse of the test signal was launched along the optical path, and the time of receipt of the scattered signal at the detector stage, taking into account the speed of light along the optical path.

The detector stage is configured to receive the scattered signal from the optical path. Thus, the detector stage may be connectable (or connected) to the optical path in order to receive the scattered signal. For example, the first detector stage may include a connector for connecting an input of the detector stage to the optical path.

The detector stage is further configured to interfere the local oscillator signal with the received scattered signal. In this manner, interference of the scattered signal and local oscillator signal can be detected, which may in turn enable conditions (e.g. acoustic modulations and/or temperature changes) at the corresponding scattering location in the optical path to be determined. For example, scattering of the test signal along the optical path may result in a phase shift and/or frequency shift of the scattered signal, which can be detected via the interference with the local oscillator signal.

The detector stage may be configured to produce an output signal based on (e.g. representative of) the interference of the local oscillator signal and the scattered signal. For example, the detector stage may comprise an optical detector which is arranged to generate an output signal that is representative of an intensity of incident light on the detector. The optical detector may be a square law detector. A square law detector outputs a signal having an intensity that is proportional to the square of the field amplitude of incident light on the detector. Both the local oscillator signal and/or the scattered signal may be incident on the detector of the first detector stage, such that they interfere at the detector. As a result, the detector (e.g. square law detector) may produce an output signal that is related to an intensity produced by the interference of the local oscillator signal and the scattered signal.

The detector stage may also be used for direct detection of the scattered signal, i.e. where the scattered signal is not interfered with the local oscillator signal. For example, the local oscillator stage may be deactivated or controlled so that no local oscillator signal is generated, such that only the scattered signal is incident on the optical detector of the detector stage, thus enabling direct detection of the scattered signal. This may allow the system to be used for measurements which are based on direct detection of the scattered signal.

The optical measurement system is implemented with one or more photonic integrated circuits (PICs). In other words, at least part of the optical measurement system may be implemented on a PIC. In some cases, the optical measurement system may be implemented on a single PIC, whilst in other cases the optical measurement system may be implemented on multiple PICs which are connected (or connectable) together.

As an example, the coherent light source, launch stage, local oscillator stage and detector stage may each be implemented on one or more PICs. Thus, integrated optical components may be used for the different parts of the system, with integrated optical waveguides providing required connections between the various components.

Herein, a PIC may refer to an integrated circuit comprising one or more photonic (optical) components.

Implementing the optical measurement system with one or more PICs may serve to reduce a size of the optical measurement system, thus facilitating its use in a variety of situations where space may be an issue. The use of PICs may further serve to improve a reliability and durability of the system, as optical connections between components of the system may be formed as part of the fabrication process. As a result, a risk of optical components being misaligned or falling out of alignment may be reduced. Additionally, the use of PICs may contribute to reducing a manufacturing cost of the optical measurement system, due to economies of scale associated with integrated circuit fabrication. Accordingly, the invention may provide a compact and versatile measurement system which can be used for performing a variety of optical measurements.

Note that in some embodiments, not all of the components of the system may be included in the one or more PICs. For example, one or more components of the system may be separate from the one or more PICs, with suitable connection provided to the one or more PICS.

The optical measurement system may further comprise a polarising beam splitter configured to split the light signal received by the launch stage into a first polarisation state and a second polarisation state, and wherein the first IQ modulator includes a pair of IQ modulators for controlling the light signal in the first polarisation state and the second polarisation state, respectively. In this manner, polarisation of the test signal can be controlled. This may provide a further degree of flexibility of the system of the invention, by enabling the optical path to be interrogated with test signals having different polarisation states. Each IQ modulator in the pair of IQ modulators may control the amplitude, phase and/or frequency of the test signal in the corresponding polarisation state. The polarising beam splitter may split the light signal into two branches (or arms), each corresponding to a respective one of the first and second polarisation states.

The first and second polarisation states may be combined to form the test signal. Accordingly, by controlling the pair of IQ modulators, relative amplitudes of the two polarisation states can be controlled, such that a test signal with an arbitrary polarisation state can be generated. For example, the launch stage may further comprise a polarisation beam combiner arranged to combine outputs from the pair of IQ modulators to form the test signal.

The first polarisation state and the second polarisation state may correspond to two different polarisation states, for example vertical and horizontal polarisation.

A variable Faraday rotator may be connected between the light source and the polarising beam splitter. The variable Faraday rotator may be configured to controllably rotate a polarisation direction of the light signal incident of the polarising beam splitter. By rotating the light signal relative to an axis of the polarising beam splitter, it is possible to control relative magnitudes of the light signal in the first polarisation state and the second polarisation state. Accordingly, by controlling the variable Faraday rotator, it is possible to control a polarisation state of the test signal.

The variable Faraday rotator may also be controlled so that most or all of the light signal in a selected one of the first and second polarisation states. In this manner, one of the polarisation states may effectively be switched off, with minimal loss of light signal.

The first IQ modulator and/or the second IQ modulator may respectively comprise a first branch and a second branch with a phase delay introduced between the first branch and the second branch, and wherein each of the first branch and the second branch comprises a respective amplitude and phase modulator. Such an arrangement of modulators may be referred to as a nested (or cascaded) modulator structure. The phase delay between the first branch and the second branch may correspond to a delay of $\pi/2$ (i.e. 90 degrees), such that the first branch and the second branch may act as the I and Q components of the local oscillator signal. In this manner, the amplitude and phase modulators on the first and second branches allow control of the I and Q components of the signal.

The amplitude and phase modulator on each branch may be implemented using any suitable modulator or combination of modulators enabling control of amplitude and phase of an optical signal. As an example, the amplitude and phase modulator may comprise a Mach-Zehnder modulator which enables control of the amplitude and phase of the signal. Where a Mach-Zehnder modulator is used for controlling the amplitude and phase of the signal in each branch, such an arrangement of Mach-Zehnder modulators may be referred to as a nested (or cascaded) Mach-Zehnder modulator. Thus, the first and/or second IQ modulator may include such a nested Mach-Zehnder structure.

The phase delay between the first branch and the second branch may be introduced using a suitable optical component. In some cases, the phase delay may be introduced by an additional (e.g. third) phase modulator (e.g. a Mach-Zehnder modulator) which is in one of the first branch and the second branch. For instance, the additional phase modulator (e.g. Mach-Zehnder modulator) may be adjusted such that the phase delay between the two branches is held at $\pi/2$.

A beam splitter may be provided for splitting the light signal into the first branch and the second branch. Additionally, a beam combiner may be arranged to combine the outputs from the Mach-Zehnder modulators in each branch to form the local oscillator signal.

Where the first IQ modulator includes a pair of IQ modulators as described above, each IQ modulator in the pair may have a nested structure as described above, to enable control of the I and Q components for each polarisation state of the test signal.

The optical measurement system may further comprise a reference interferometer connected to receive a portion of the light signal from the light source, wherein the reference interferometer is configured to interfere a first portion of the received light signal with a second, delayed portion of the received light signal. The reference interferometer may enable a phase noise and/or linewidth of the light source to be monitored, to help ensure suitable noise characteristics for the light source. A major challenge with optical measurement systems is ensuring that the light source (e.g. laser) has a low enough phase noise. Accordingly, integrating the reference interferometer directly into the optical measurement system may facilitate monitoring noise characteristics of the light source, and enable the light source and/or measurement to be adjusted to compensate for detected phase noise.

The reference interferometer may comprise an optical detector (e.g. a square law detector) on which the first and second portions of the light signal are interfered, to enable measurement of the interference.

The reference interferometer may include any suitable optical component(s) for delaying the second portion of the light signal relative to the first portion of the light signal. For example, the reference interferometer may include a delay line arranged to delay the second portion of the light signal relative to the first portion of the light signal.

The reference interferometer may be implemented on one of the one or more PICS of the optical measurement system.

In some embodiments, the reference interferometer may be implemented on a same PIC as the light source. This may enable integration of the reference interferometer with the light source, which may facilitate monitoring a performance of the light source.

The optical measurement system may further be configured to determine a phase noise of the light source based on the interference of the first portion and the second portion of the received light signal in the reference interferometer. Determining the phase noise of the light source may enable a user to determine if the light source is performing as required for a desired optical measurement. Additionally, the determined phase noise can be used for compensating for the phase noise, to improve a quality of the measurement.

As an example, the phase noise determined from the reference interferometer can be digitally (numerically) removed from measurement data (e.g. the output signal from the detector stage), to improve a quality of the measurement data. Thus, the optical measurement system may be configured to apply a correction to an output of the detector stage based on the determined phase noise. The correction may be applied directly to the data output from the optical detector of the detection stage, or the correction may be applied as part of a data analysis algorithm which is used for analysing the data output from the detector stage.

Additionally or alternatively, the phase noise determined from the reference interferometer can be used in a feedback loop for controlling the light source, in order to reduce or minimise the phase noise of the light source. Thus, the optical measurement system may be configured to control the light source based on the determined phase noise.

As an example, the system may be configured to control a temperature of the light source and/or a current supplied to the light source based on the determined phase noise, to reduce or minimise the phase noise of the light source. Another approach is to determine the phase noise component contributed to the output signal by the source and then remove this digitally from the output data.

The optical measurement system may comprise a controller for determining the phase noise from the reference interferometer, and performing any of the subsequent compensation steps. The controller may be configured to receive an output signal from the optical detector of the reference interferometer, and to determine the phase noise based on the received output signal.

The detector stage may comprise a polarising beam splitter arranged to split a first one of the local oscillator signal and the scattered signal into a first polarisation state and a second polarisation state, and wherein the detector stage is configured to interfere a second one of the local oscillator signal and the scattered signal with each of the first and second polarisation states. In this manner, the detector stage may enable polarisation diverse detection. This may serve to ensure that interference of the scattered signal and local oscillator signal can be detected for at least one of the polarisation states, e.g. in cases where polarisation of the scattered signal varies relative to polarisation of the local oscillator signal. The first polarisation state and the second polarisation state may correspond to different polarisation states, e.g. vertical polarisation and horizontal polarisation.

For example, the polarising beam splitter may split the scattered signal into two polarisation states, such that the local oscillator signal is interfered with the scattered signal in each polarisation state (or vice versa).

The detector stage may comprise an optical detector for detecting the interference in each polarisation state. In this manner, a separate analysis of the signals may be performed for each polarisation state.

The detector stage may comprise a plurality of input channels, each input channel configured to receive a respective scattered signal, and wherein the detector stage is configured to separately interfere the local oscillator signal with each one of the respective scattered signals. In this manner, the detector stage may be capable of receiving scattered signals from multiple optical paths simultaneously. This may facilitate simultaneous monitoring of multiple optical paths using the same system.

In embodiments where the detector stage comprises a plurality of input channels as mentioned above, the launch stage may be configured to launch the test signal along multiple optical paths. For example, the launch stage may be configured to split the test signal between multiple optical paths, such that a respective portion of the test signal is transmitted to each of the multiple optical paths. Alternatively, the launch stage may comprise a demultiplexer (de-mux), which is configured to selectively couple the launch stage to one of the multiple optical paths. In this manner, the test signal can be launched along a selected one of the multiple optical paths. For instance, the demultiplexer may be configured to (or controlled to) sequentially launch the test signal along each of the multiple optical paths.

The optical measurement system may further comprise a controller configured to control the first IQ modulator and the second IQ modulator. This may facilitate control of the local oscillator signal and test signal, so that a desired measurement can be performed on the optical path. For example, the controller may be programmed to automatically control the first IQ modulator and the second IQ modulator, to perform a desired measurement. Additionally or alternatively, the controller may enable a user to manually control the first and second IQ modulators.

The controller may be connected (e.g. via a wired or wireless connection) to the first IQ modulator and the second IQ modulator, to enable control of the first and second IQ modulators. The controller may transmit respective control signals for controlling the first and second IQ modulators. As an example, where the first (second) IQ modulator includes a nested modulator structure as discussed above, the controller may control each of the phase and amplitude modulators in the arrangement, e.g. by controlling a voltage supplied to each of the modulators. The controller may be implemented using any suitable computing device or system capable of interfacing with the first IQ modulator and the second IQ modulator. The controller may comprise a processor and a memory storing instructions, wherein execution of the instructions by the processor causes the processor to control the first IQ modulator and the second IQ modulator. Examples of control of the first and second IQ modulators are discussed in more detail below. The controller may be separate from the one or more PICS.

The controller may be configured to control a phase, frequency, pulse duration and/or amplitude of the test signal, by controlling the first IQ modulator. Likewise, the controller may be configured to control a phase, frequency, pulse duration and/or amplitude of the local oscillator signal, by controlling the second IQ modulator. Accordingly, the controller may enable full control of the test and local oscillator signals, so that characteristics of the test and local oscillator signals can be set in accordance with a desired measurement type.

The controller may further be connected (e.g. via a wired or wireless connection) to the detector stage, to receive the output signal(s) from the optical detector(s) in the detector stage. The controller may then be configured to process the output signal(s), e.g. in order to determine information about conditions (e.g. strain and/or temperature) along the optical path. The controller may also be connected (e.g. via a wired or wireless connection) to the reference interferometer, to receive an output signal from the optical detector in the reference interferometer, in order to determine a phase noise of the light source. In line with the discussion above, the controller may then take steps to compensate for the phase noise of the light source.

The controller may be configured to control the first IQ modulator to vary a frequency of the test signal over time. Varying the frequency of the test signal over time may enable a variety of different measurements on the optical path. For example, varying the frequency of the test signal may enable a frequency shift between the test signal and the local oscillator signal to be varied between successive pulses, enabling different measurements to be performed with successive pulses. For instance, successive pulses may be tailored for probing Rayleigh scattering and Brillouin scattering, so that the two types of scattering can be detecting on successive pulses. As another example, varying the test signal over time may enable a multi-frequency test pulse to be generated.

Other properties of the test signal pulses may be varied over time, such as their amplitude, power, phase, and/or pulse duration. This may enable the test signal to be further tailored to a particular scattering mechanism.

Additionally or alternatively, the controller may be configured to control the second IQ modulator to vary a frequency of the local oscillator over time. Similarly to varying the frequency of the test signal over time, this may facilitate performing different measurements with successive pulses. For example, where the frequency of the test signal is alternated to probe Rayleigh scattering and Brillouin scattering with successive pulses, the frequency of the local oscillator signal may be alternated over time, to ensure that the difference frequency between the local oscillator signal and the scattered signal remains within a detection bandwidth of the detector stage.

The controller may be configured to vary the frequency of the test signal and/or the frequency of the local oscillator signal according to a predetermined sequence. The predetermined sequence may be set in order to obtain a desired set of measurements on the optical path.

The controller may be configured to control a frequency of the test signal by driving the first IQ modulator as a single sideband modulator. Additionally or alternatively, the controller may be configured to control a frequency of the local oscillator by driving the second IQ modulator as a single sideband modulator. Driving an IQ modulator as a single sideband modulator may facilitate frequency shifting of the signal.

In some cases, the single sideband modulator may be a partially suppressed carrier single sideband modulator. In other words, the single sideband modulator may be non-perfectly biased so as to not fully suppress the original carrier signal which is fed into it (e.g. the light signal). As a result, the single sideband modulator may output a frequency-shifted copy of the original carrier signal, whilst not fully suppressing the original carrier signal. Accordingly, the single sideband modulator can output a signal having two components, i.e. a first component which is frequency-shifted and a second component which is non-frequency-shifted. Thus, driving the first IQ modulator as a partially suppressed carrier single sideband modulator may provide a test signal with first and second components. Likewise, driving the second IQ modulator as partially suppressed carrier single sideband modulator may provide a local oscillator signal with first and second components. The ability to provide a test signal and/or a local oscillator signal with two components may enable various measurements, including combined (e.g. simultaneous) DAS and DSTS measurements.

In other cases, the single sideband modulator may be a fully suppressed carrier single sideband modulator. In this manner, the original carrier signal fed to the single sideband modulator may be fully suppressed, such that the single sideband modulator only outputs a frequency-shifted copy of the received carrier signal. In this manner, driving the first IQ modulator as a fully suppressed carrier single sideband modulator effectively enables the frequency of the test signal to be shifted, whilst driving the second IQ modulator as a fully suppressed carrier single sideband modulator effectively enables the frequency of the local oscillator signal to be shifted.

The controller may comprise two or more selectable measurement modes, and a memory arranged to store, for each of the two or more measurement modes, a respective set of control parameters for the first IQ modulator and the second IQ modulator; and the controller may be configured to control the first IQ modulator and the second IQ modulator in accordance with the set of control parameters associated with a selected one of the two or more measurement modes. In this manner the first and second IQ modulators may be automatically controlled in accordance with a selected measurement mode. This may greatly facilitate operating the optical measurement system to perform different types of measurements on the optical path, as the control parameters for the first and second IQ modulators may be pre-set. Accordingly, a user may simply select a desired measurement mode, and the IQ modulators will be automatically controlled to provide the desired measurement.

As an example, the optical system may comprise two or more of a Distributed Acoustic Sensing (DAS) mode, a Distributed Strain and Temperature Sensing (DSTS) mode, and a combined DAS and DSTS mode. Further measurement modes which take advantage of controllability of the test and local oscillator signals are also possible.

In some embodiments, the coherent light source may be implemented on a separate PIC from the launch stage, local oscillator stage and the detector stage. In this manner, different substrates may be used for the PIC with the light source and other PICs of the system. This may be advantageous, as the light source may benefit, for example, from being on a different type of substrate compared to the IQ modulators. A further benefit of providing the light source on a separate PIC is that this may enable the light source to easily be removed from the system, e.g. to enable repair or maintenance of the light source. For example, this may enable the light source to be replaced, without having to replace the entire system. This may also enable different light sources to be used with the system, e.g. depending on the type of measurement to be performed with the system.

In some cases, the optical measurement system may be modular, to facilitate removal and replacement of different parts. For example, the light source, launch stage, local oscillator stage, and detector stage (and reference interferometer, if present), may be implemented on two or more PICS which are removably connected together. In this manner, the two or more PICs may easily be disconnected from one another, to facilitate removing and relacing different parts of the system. This may also facilitate upgrading or adapting the system, e.g. with components that are tailored for a particular type of measurement.

BRIEF DESCRIPTION OF THE DRAWINGS

An embodiment of the invention is discussed below in more detail with reference to the accompanying drawings, in which.

DETAILED DESCRIPTION; FURTHER OPTIONS AND PREFERENCES

Figure 1A:
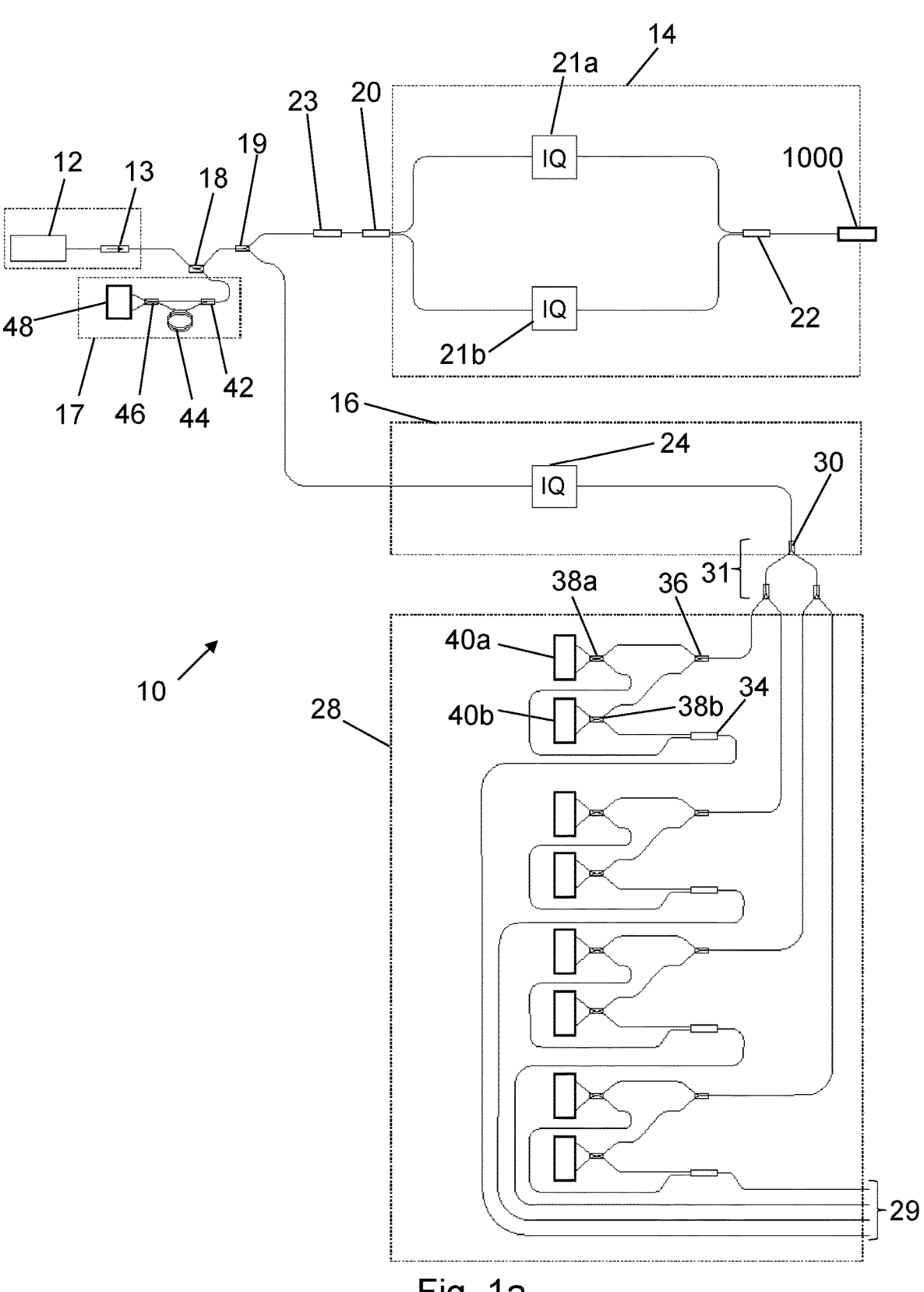
FIG. 1a is a schematic diagram of an optical measurement system according to an embodiment of the invention.

FIG. 1a shows a schematic diagram of an optical measurement system 10 according to an embodiment of the invention. The optical measurement system 10 is configured to enable different types of optical measurements such as DAS and DSTS on a single optical path. The optical measurement system 10 may, for example, be operated as an optical time domain reflectometer (OTDR) system and/or as an optical frequency domain reflectometer (OFDR). The system 10 is arranged to interrogate an optical path, which may comprise an optical fibre 1000. The optical fibre 1000 may be of any desirable length for a given purpose.

The system 10 comprises a coherent light source 12 which produces a coherent light signal. The light source 12 may be a laser, which is used in continuous wave (CW) operation. The light source 12 is coupled to a launch stage 14, a local oscillator stage 16, and a reference interferometer 17 by a set of optical couplers or beam splitters. In this manner, a first portion of light emitted by the light source 12 is transmitted to the launch stage 14, a second portion of the light emitted by the light source 12 is transmitted to the local oscillator stage 16, and a third portion of the light signal emitted by the light source 12 is transmitted to the reference interferometer 17. In more detail, a first optical coupler 18 splits the light signal such that a portion of the light signal is transmitted to the reference interferometer 17 and the remaining portion of the light signal is transmitted to a second optical coupler 19. The second optical coupler 19 then further splits the light signal into a first portion which is transmitted to the launch stage 14 and a second portion which is transmitted to the local oscillator stage 16. Other arrangements of optical couplers and/or beam splitters may be used for splitting the light signal between the launch stage 14, local oscillator stage 16, and the reference interferometer 17. The optical couplers 18, 19 may be arranged such that approximately 90% of the light signal is directed into the launch stage 14, with the remainder of the light signal being split between the local oscillator stage 16 and the reference interferometer 17. The proportions of incoming light directed into each stage may be chosen by the operator depending on the nature of the operation for which the system 10 is used. Optionally, an optical isolator 13 may be coupled to an output of the light source 12, to ensure that light is not passed back to the light source.

The launch stage 14 includes a polarising beam splitter (PBS) 20 configured to split the light signal received from the light source 12 into a first polarisation state and a second polarisation state, e.g. vertical and horizontal polarisation states. The light signal in the first polarisation state is conveyed along a first branch (or arm) of the launch stage 14, whilst the light signal in the second polarisation state is conveyed along a second branch (or arm) of the launch stage 14. The launch stage 14 further includes a pair of IQ modulators 21a, 21b, one in each branch of the launch stage 14. The IQ modulator 21a is arranged to receive the light signal in the first polarisation state and generate a signal in the first polarisation state, and the IQ modulator 21b is arranged to receive the light signal in the second polarisation state and generate a signal in the second polarisation state. A polarisation beam combiner 22 then combines the outputs of the pair of IQ modulators 21a, 21b to form a test signal, which is launched along the optical fibre 1000. For example, an output of the polarisation beam combiner 22 may be coupled to a connector for connecting the launch stage to the optical fibre 1000. In some cases, the launch stage 14 may be configured to launch the test signal along multiple optical paths (e.g. optical fibres) simultaneously, so that multiple optical paths can be monitored simultaneously (see discussion below in relation to FIG. 1b). In such a case, the output of the polarisation beam combiner 22 may be coupled to a beam splitter (not shown), for transmitting the test signal along the multiple optical paths.

The IQ modulators 21a, 21b can control an amplitude of the test signal in the first polarisation state and the second polarisation state, such that a test signal with an arbitrary (i.e. desired) polarisation state can be generated. Additionally, the IQ modulators 21a, 21b can be used to control the frequency and phase of the test signal in each polarisation state. Together, the pair of IQ modulators 21a, 21b in the launch stage 14 may be referred to as a 'first' IQ modulator of the system 10, as together they allow control of the test signal which is launched along the fibre 1000. An example IQ modulator which can be used for implementing the IQ modulators 21a, 21b is described below with reference to FIG. 2.

The test signal generated by the launch stage 14 may be a pulsed test signal. Thus, the IQ modulators 21a, 21b may be controlled to create pulsed signals, e.g. by controlling an amplitude of the generated signals over time, which are combined to form a pulsed test signal. Alternatively, the test signal may be a continuous or quasi-continuous wave signal.

The launch stage 14 may be connected to the second optical coupler 19 via a variable Faraday rotator 23. The variable Faraday rotator 23 enables single polarisation operation without excessive loss, for example by aligning the received light signal to the first polarisation state or the second polarisation state. Additionally, the variable Faraday rotator 23 allows an orientation of the polarisation of the light signal incident of the PBS 20 to be controlled, which may enable relative amplitudes of the signal in the first polarisation state and the second polarisation state to be controlled.

The local oscillator stage 16 includes a second IQ modulator 24 which is configured to receive the second portion of the light signal from second optical coupler 19 and generate a local oscillator signal. Similarly to the IQ modulators 21a, 21b discussed above, the second IQ modulator 24 enables control of an amplitude, phase and frequency of the local oscillator signal. The second IQ modulator 24 may, for example, be implemented as described below with reference to FIG. 2.

The system 10 further comprises a detector stage 28. In the example shown, the detector stage 28 includes four detection channels, to enable simultaneous monitoring of up to four optical paths (e.g. optical fibres). The detector stage 28 includes a set of four inputs 29, each of which is arranged to receive a scattered signal from a respective optical path (such as the optical fibre 1000), and convey the scattered signal to a corresponding detection channel. The detector stage 28 further includes an input 30 connected to an output of the local oscillator stage 16 to receive the local oscillator signal. The input 30 includes a set of beam splitters 31 arranged to split the local oscillator signal between the four detection channels.

Each detection channel in the detector stage 28 includes a PBS 34. The PBS 34 splits the received scattered light signal into a horizontally polarised state and a vertically polarised state. The PBS 34 is used as the polarisation of the test signal and also of the scattered signal will evolve as a function of distance as they pass through the optical path. The PBS 34 therefore enables polarisation diverse detection, to ensure that a signal can always be detected, regardless of a polarisation state of the scattered signal. The local oscillator signal, which is highly polarised, is split equally between two paths using a polarisation maintaining optical coupler 36. In other embodiments, the local oscillator signal may be split into two polarisation states in preference to the scattered signal as described.

Each detection channel further includes first and second optical couplers 38a, 38b, configured to mix the LO signal with a respective one of the horizontal and vertical states of the scattered signal. The detector stage further includes a pair of optical detectors in the form of a first balanced square law differential detector 40a and a second balanced square law differential detector 40b, on which the light output from each optical coupler 38a, 38b is respectively interfered. Balanced differential detection may be used, in order to remove common mode amplitude noise from the detected signal. The first and second square law detectors each provide a respective output signal, which is representative of the interference between the scattered signal and the local oscillator signal. In this manner, interference of the scattered and local oscillator signals can be measured for each polarisation state. The output signals from the balanced square law differential detectors 40a, 40b may be taken and measured via respective analog-to-digital converters (not shown) for further analysis, e.g. to determine conditions at a scattering location in the optical path. In more detail, each of the balanced square law differential detectors 40a, 40b may be implemented with a pair of balanced square law detectors. The analog-to-digital converter may then acquire and measure a differential signal between the pair of square law detectors. Note that, for illustration purposes, components of only one of the detection channels is labelled in FIG. 1a. However, each of the four detection channels in the detector stage 28 have a same structure, and thus enable measurement of interference between the local oscillator signal and the scattered signal received by that detection channel.

In the example shown, the detector stage 28 includes four detection channels, thus enabling simultaneous measurements on four optical paths (e.g. optical fibres). However, other embodiments may include other numbers of detection channels in the detector stage, such as one, two, three, or more than four, depending on the number of optical paths to be measured.

The launch stage 14 and the detector stage 28 may be coupled to the optical fibre 1000 via an optical circulator (not shown), which is arranged to transmit the test signal from the launch stage 14 to the optical fibre 1000, and to transmit the scattered signal from the optical fibre 1000 to an input 29 of the detector stage 28. For example, the test signal may enter the circulator through a first port, where it is passed to a second port in order to enter the optical fibre 1000. As the test signal passes through the fibre 1000, a fraction of the light is backscattered from the fibre 1000 by a variety of scattering mechanisms (including Rayleigh scattering and Brillouin scattering). A portion of the back-scattered light is captured and guided back along the optical fibre 1000 towards the circulator. The scattered light, which may be referred to herein as a scattered signal, enters the circulator at the second port, and leaves the circulator to enter the detection stage 28 via a third port. Where the system 10 is used to measure multiple optical paths simultaneously, a respective optical circulator may be used for each optical path in a manner analogous to that described above (see FIG. 1b).

As mentioned above, the system 10 further includes a reference interferometer 17. The reference interferometer 17 is connected to an output of the optical coupler 18 to receive a portion of the light signal from the light source 12. The reference interferometer 17 includes an optical coupler 42 which splits the received light signal between an undelayed path and a delayed path including a delay line 44. The light signals from the delayed and undelayed paths are then combined at an optical coupler 46, and interfered on an optical detector 48 such as a balanced square law differential detector. An output signal from the optical detector 48 can be measured using an analog-to-digital converter (not shown) for further analysis. In particular, the output signal from the optical detector 48 in the reference interferometer 17 can be used to monitor noise characteristics of the light source, so that noise of the light source 12 can be compensated for in the measurements.

The optical measurement system 10 is implemented on one or more photonic integrated circuits (PICS). Accordingly, components of the system 10 such as the light source 12, IQ modulators, optical detectors, optical couplers and other optical components may all be implemented as integrated components in a PIC. Interconnections between the various components of the system 10 may be implemented using waveguides in the PICs. The system 10 may thus be fabricated using suitable known manufacturing techniques for PICs. The optical measurement system 10 may be provided on a single PIC, or it may be implemented with multiple PICs which are connected together. Where the system 10 is implemented with multiple PICs, the PICs may be removably connected to one another, e.g. via suitable connectors. This may facilitate removing and replacing different parts of the system.

As an example, the light source 12 may be implemented on a different PIC compared to the launch stage 14 and the local oscillator stage 16. A benefit of such an arrangement is that different substrates can be used for the PIC with the light source 12 and for the one or more PICs including the IQ modulators 21a, 21b and 24. In this manner, the substrates of the PICs may be adapted to the components which they are carrying, which may improve a performance of the system 10. Using multiple PICs to implement the system 10 may serve to improve a production yield. For instance, if a defect occurs on one the PICs, the remaining PICs may still be useable and the defective PIC can be replaced. In contrast, where a single PIC is used, a single defect may make the entire system unusable. A further benefit of using multiple PICs is that if a fault occurs on one of the PICs, the faulty PIC may be replaced without having to replace the entire system 10. This may facilitate and reduce a cost of maintenance of the system 10. The use of multiple PICs may further enable a modular approach with the system 10. For instance, by providing the light source 12 on a separate (e.g. dedicated) PIC, it is possible to use different light sources without having to replace the entire system 10. In this manner, a user may select a the light source which is suited to a desired type of measurement. In a similar manner, any of the launch stage 14, local oscillator stage 24, detector stage 28 and reference interferometer 17 may be provided on a separate (i.e. dedicated) PIC, so that it can easily be removed and replaced in the system. For example, this may enable detector stages with different numbers of detection channels to be used, depending on the number of optical paths to be measured.

As discussed above, in the example shown, the launch stage is configured to enable control of the polarisation state of the test signal which is launched along the optical fibre 1000. However, in other embodiments, the launch stage need not necessarily be configured to enable control of the polarisation state. For example, in some embodiments the launch stage may not include the PBS 20 and combiner 22, and may include only a single IQ modulator.

Figure 1B:
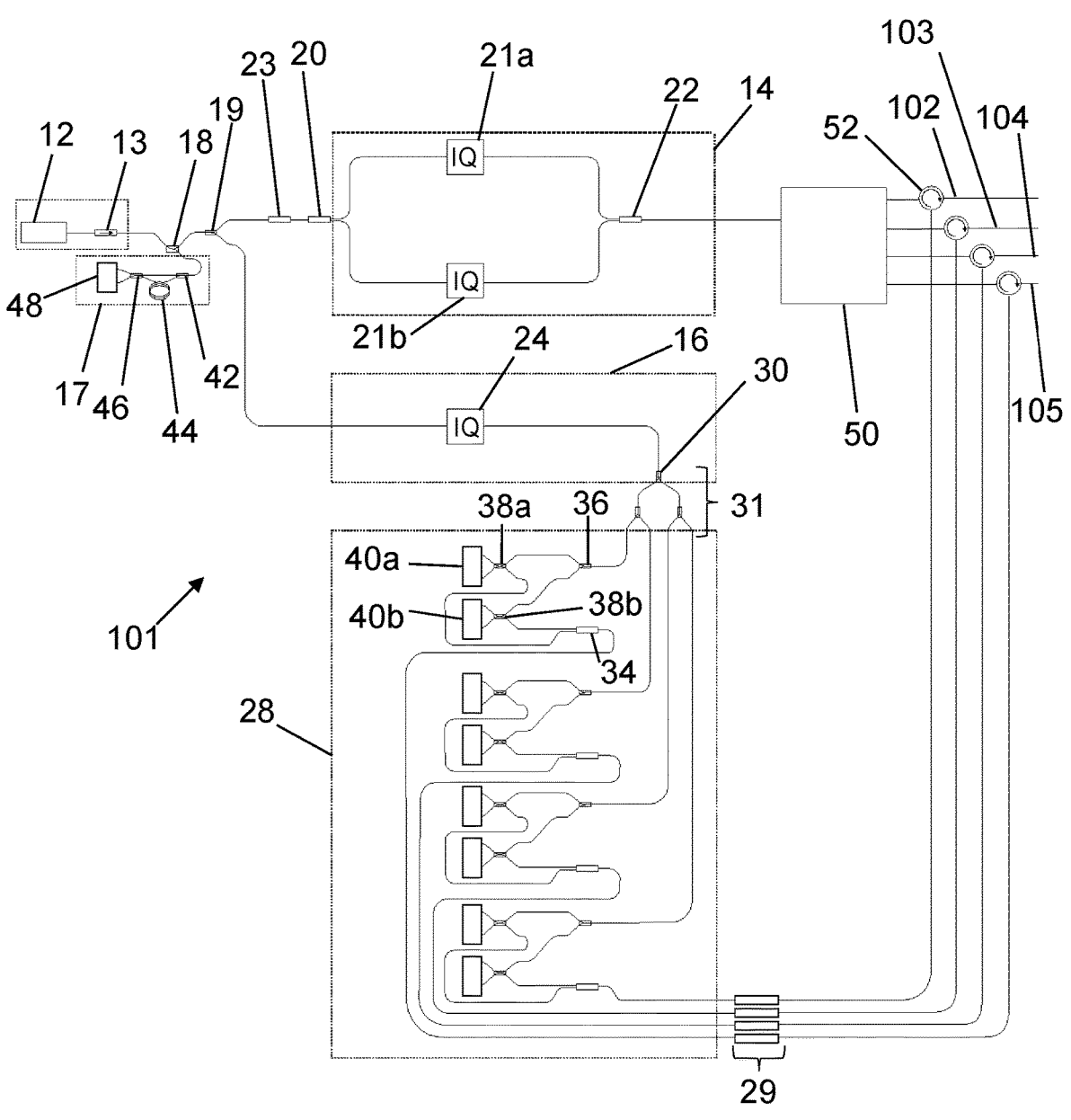
FIG. 1b is a schematic diagram of an optical measurement system according to an embodiment of the invention.

FIG. 1b shows a schematic diagram of an optical measurement system 101 that is a variation of the system 10 described above. Accordingly, features of the system 101 which correspond to features of the system 10 described above are indicated with the same reference numerals in FIG. 1b as in FIG. 1a, and are not described again.

The system 101 of FIG. 1b is adapted to launch the test signal along four optical paths 102, 103, 104, 105. In particular, as shown in FIG. 1b, the output of the launch stage 14 is connected to an output stage 50, which is configured to transmit the test signal to each of the four optical paths 102, 103, 104, 105. In more detail, the output stage 50 may comprise an optical amplifier that is configured to amplify the test signal. The output stage 50 may further comprise an attenuator connected to the amplifier, for controlling a power of the amplified test signal. The output stage 50 may further comprise a demultiplexer which is configured to selectively transmit the amplified test signal to one of the four optical paths 102, 103, 104, 105. Alternatively, the output stage 50 may comprise a beam splitter arranged to split the amplified test signal between the four optical paths 102, 103, 104, 105, such that respective portions of the test signal are simultaneously transmitted along the optical paths.

Each of the four optical paths 102, 103, 104, 105 is coupled to the output stage 50 via a respective circulator 52. For example, each of the four optical paths 102, 103, 104, 105 may be coupled to a respective output channel of the demultiplexer via its respective circulator 52. In line with the discussion above in relation to FIG. 1a, the circulator 52 for each optical path is arranged to transmit the test signal to the optical path, and further to receive a scattered signal from the optical path and transmit the scattered signal to a corresponding input of the detector stage 28. Thus, as can be seen in FIG. 1b, the third port of each circulator 52 is connected to a corresponding input 29 of the detector stage 28, where the scattered signal can be interfered with the local oscillator signal.

Figure 2:
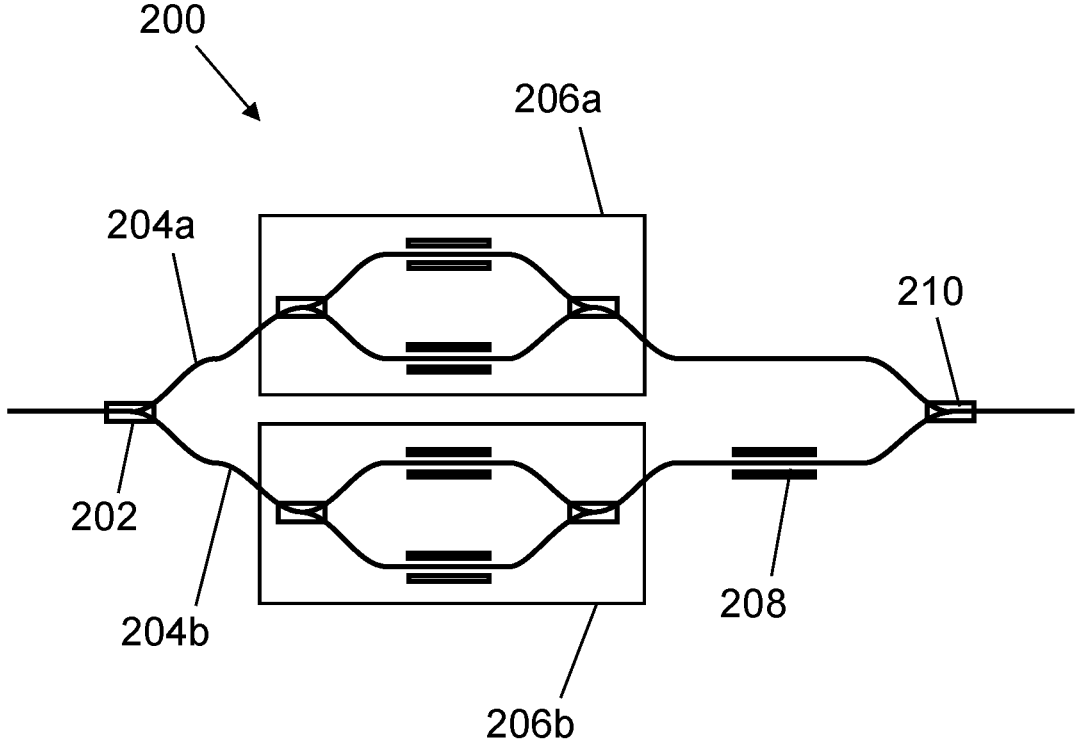
FIG. 2 is a schematic diagram of an IQ modulator that may be used as part of an embodiment of the invention.

Turning to FIG. 2, an example IQ modulator will now be described. FIG. 2 shows a schematic diagram of an IQ modulator 200 which may be used as part of an optical measurement system according to the invention. For example, the IQ modulator 200 may be used as any of the IQ modulators 21a, 21b and 24 of the system 10 described above.

The IQ modulator 200 comprises a beam splitter 202 which splits an incoming light signal into a first branch (arm) 204a and a second branch 204b (arm). Each branch 204a, 204b includes a respective amplitude and phase modulator in the form of a Mach-Zehnder modulator 206a, 206b. The second branch 204b further includes a phase shifter 208 following the Mach-Zehnder modulator 206b, which is arranged to introduce a phase delay between the first branch 204a and the second branch 206a. A beam combiner 210 is further arranged to combine the outputs from the Mach-Zehnder modulators 206a, 206b to provide an output signal. The arrangement of Mach-Zehnder modulators depicted in FIG. 2 may be referred to as a nested (or cascaded) Mach-Zehnder configuration. The phase shifter 208 may be controlled (e.g. via an applied biasing voltage) such that the phase delay between the two branches is held at π/2 (i.e. 90 degrees). In this manner, the first branch 204a may act as the in-phase (I) component of the signal, whilst the second branch 204b may act as the orthogonal quadrature (Q) component of the signal. In this manner, by controlling the Mach-Zehnder modulators 206a, 206b, the I and Q components of the output signal can be modulated in time, allowing a desired complex signal to be generated.

In more detail and as shown in FIG. 2, each Mach-Zehnder modulator 206a, 206b may include a beam splitter arranged to further split the light signal into two sub-branches, each sub-branch comprising a respective phase shifter. The two sub-branches are then re-combined via a beam combiner. The phase shifters in the sub-branches are driven by respective control signals (e.g. voltage signals), to modulate (control) the phase shift applied in each branch. In this manner, different phase modulations can be applied to the two sub-branches to result in an amplitude modulation of the light signal. Accordingly, amplitude modulation of the I and Q components of the output signal can be achieved via control of the phase shifters in the Mach-Zehnder interferometers 206a, 206b. Likewise, the phase shifters in the Mach-Zehnder interferometers 206a, 206b can be controlled to control phase modulation of the I and Q components of the signal. Whilst the IQ modulator 200 is implemented using Mach-Zehnder modulators, other types of amplitude and phase modulators may also be used.

Frequency control of the output signal can be achieved by driving the IQ modulator 200 as a suppressed carrier single sideband (SC-SSB) modulator. To do this, each Mach-Zehnder modulator 206a, 206b may be biased towards its minimum transmission, e.g. n radians, with the I-component Mach-Zehnder modulator 206a being driven with a drive signal having the form A cos(ωt) and the Q-component Mach-Zehnder modulator 206b being driven with a drive signal having the form A sin(ωt). Here, ω is an angular frequency shift and A is a drive amplitude. Accordingly, the angular frequency of the signal output by the IQ modulator 200 will be shifted by an amount corresponding to w. The drive amplitude may be adjusted to maximise an efficiency of the modulator.

The optical measurement system 10 described above with reference to FIGS. 1 and 2 provides a high level of control over the test signal and the local oscillator signal via the IQ modulators in the launch stage 14 and the local oscillator stage 16. In particular, use of IQ modulators in both the launch stage and the local oscillator stage 16 enables general complex fields to be generated for use as the test signal and the local oscillator signal. This enables a variety of different measurements to be performed on the optical fibre 1000, by controlling the IQ modulators in order to tailor the test and local oscillator signals to a desired measurement type. For example, the inventors have found that the system 10 can be used to perform DAS measurements and DSTS measurements, either separately or simultaneously. The system 10 also enables advanced measurement techniques, involving for instance spread spectrum techniques (e.g. where the frequency of the test signal varies over time) and multi-frequency techniques (e.g. where the test signal includes a series of pulses at different frequencies).

To perform the various different types of measurements, the IQ modulators 21a, 21b and 24 may be controlled in order to generate a test signal and local oscillator signal which are suited to the desired measurement type. The system 10 may comprise a controller (not shown) which is configured to control the IQ modulators 21a, 21b and 24. In particular, the controller may be configured to provide control signals (e.g. voltage signals) to the IQ modulators 21a, 21b and 24 to control characteristics of the test signal and the local oscillator signal such as amplitude, phase, frequency, pulse duration of test signal, and polarisation of test signal. The controller may be implemented using any suitable processing (computing) device which is communicatively coupled to the IQ modulators 21a, 21b and 24 to provide a respective control signal to each of the IQ modulators. The controller may comprise a memory arranged to store control parameters for controlling the IQ modulators 21a, 21b and 24, the controller being configured to control the IQ modulators in accordance with the stored control parameters. In this manner, control parameters for performing a particular type of measurement may be pre-set and stored in the memory, so that the controller can automatically perform the desired measurement. The stored control parameters may, for example, be indicative of one or more parameters of the test signal and local oscillator signal to be generated. For example, control parameters relating to the test signal may be indicative of a pulse duration of the test signal, a frequency shift applied to the test signal, a phase shift applied to the test signal, an amplitude of the test signal, and/or a polarisation state of the test signal. Control parameters relating to the local oscillator signal may be indicative of a frequency shift applied to the local oscillator signal, a phase shift applied to the local oscillator signal, and/or an amplitude of the local oscillator signal. The controller may then generate control signals for the IQ modulators 21a, 21b and 24 based on the stored control parameters, in order to generate the test signal and local oscillator signal with desired properties.

In some cases, the controller may include multiple selectable measurement modes, each measurement mode corresponding to a respective type of measurement. A respective set of control parameters may be stored in the memory for each of the measurement modes, with the controller being configured to control the IQ modulators 21a, 21b and 24 in accordance with the control parameters associated with a selected measurement mode. In this manner, a user can select a desired measurement mode (e.g. via a user interface of the controller), and the controller may automatically control the IQ modulators 21a, 21b and 24 to perform the corresponding measurement. Such an arrangement may facilitate updating the controller to enable it to perform new or further types of measurements. For example, to perform a new type of measurement, the user may download or otherwise save a new set of control parameters for a new measurement mode. In this manner, the system 10 may easily be adapted to perform new measurement types, simply by updating the control parameters stored in the controller, and without having to modify any hardware in the system 10.

As noted above, the outputs of the square law detectors 40a, 40b in the detector stage 28 may be connected to analog-to-digital converters, to enable measurement of the output signals and further analysis of the output signals. In some cases, the controller may be connected to the analog-to-digital converters, to receive data representative of the output signals from the square law detectors in the detector stage 28. In this manner, the controller can analyse the output signals, e.g. to determine conditions such as strain and/or temperature along the optical fibre 1000. The analysis performed by the controller may be adapted to the type of measurement being performed, e.g. to the selected measurement mode. For example, the controller may store a data analysis algorithm associated with each measurement mode. The controller may then analyse (e.g. process) the data receive from the analog-to-digital converters in accordance with the data analysis algorithm corresponding to the selected measurement mode. In this manner, the system may enable a fully automated measurement process.

Several example measurement modes which can be used with the system 10 will now be described. The list of measurement examples provided below is not exhaustive, and is intended to illustrate the flexibility provided by the system 10.

DAS Mode

In a first mode of operation, the controller may be configured to perform a DAS measurement with the system 10. In the DAS mode, the IQ modulators 21a, 21b in the launch stage may be controlled to apply a frequency shift, F, to the test signal, such that the test signal is frequency shifted relative to the local oscillator signal. Alternatively, the frequency shift F may be applied via the second IQ modulator 24 to the local oscillator signal, instead of to the test signal. Such an approach where the test signal is frequency shifted relative to the local oscillator signal corresponds to a heterodyne sensing approach. The frequency shift F between the test signal and the local oscillator signal may, for example, be of the order of 100 MHz to 200 MHZ. The frequency shift F should be larger than a bandwidth required to represent the scattering without allowing crosstalk between the carrier and the DC terms which are also generated, allowing the phase and amplitude information of the scattering to be recovered using a real carrier. The IQ modulators 21a, 21b may, for example, be controlled such that the test signal has a pulse duration between 5 ns and 100 ns.

Thus, in the DAS mode, the IQ modulators 21a, 21b may typically be driven as suppressed carrier single sideband modulators, as described above. Specifically, each branch of the IQ modulators 21a, 21b may be held at the minimum transmission and then driven with suitable sine and cosine drive signals (e.g. as described above) defining the frequency offset for the heterodyne measurement. The pulse duration of the pulsed test signal may be further defined by amplitude modulating the sine and cosine drive signals. The second IQ modulator 24 in the local oscillator stage 16 may be biased to maximum transmission with a DC bias and left static. In this manner, the local oscillator signal output by the second IQ modulator 24 may be at the frequency of the light signal.

The pulsed test signal is launched along the optical fibre 1000, and subsequently interfered with the local oscillator signal in one of the detection channels of the detector stage 28, as described above. Interference of the scattered signal and the local oscillator signal on the square law detectors 40a, 40b will result in output signal from the detectors that carries a phase difference between the scattered signal and the local oscillator signal. This output signal can be analysed to extract differential strain and/or temperature information about the optical fibre 1000. For example, the applicant's earlier application published as GB 2588177 A (the entirety of which is incorporated herein by reference) provides processing techniques that can be applied to a DAS signal.

DAS and DSTS Combined Mode

In a second mode of operation, the controller may be configured to perform a combination of DAS and DSTS measurements with the system 10. In this mode, the IQ modulators 21a, 21b in the launch stage may be controlled in a similar manner to the DAS mode described above, to generate a pulsed test signal which is frequency shifted by a frequency $F_1$ relative to the light source 12, e.g. by an amount of the order of 100 MHz to 200 MHZ.

Figure 3A:
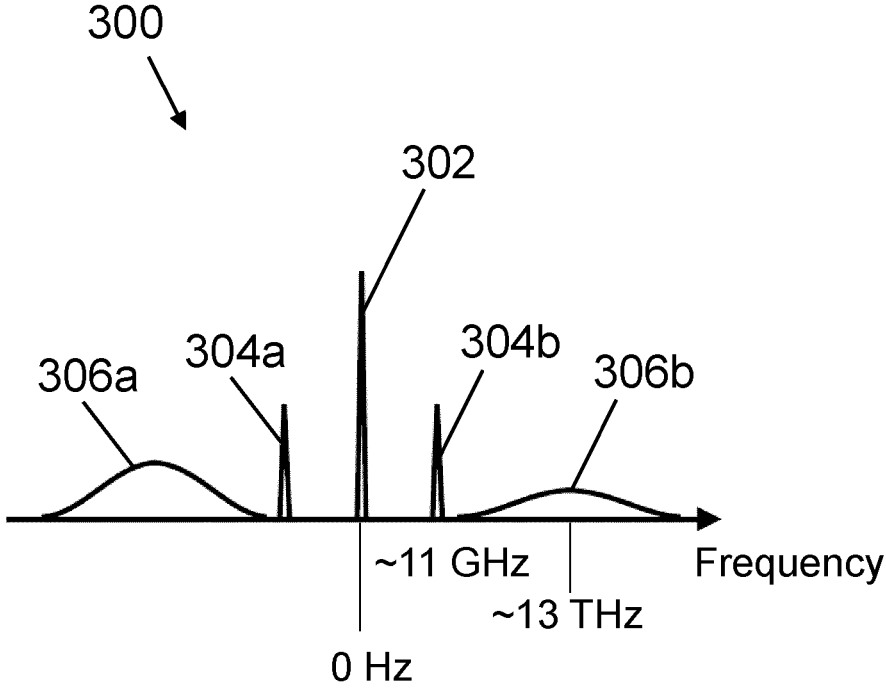
FIG. 3a is an example spectrum of a scattered signal obtained from an optical fibre.

In line with the discussion above, as the test signal passes through the fibre 1000, a fraction of the light is backscattered from the fibre 1000 by a variety of scattering mechanisms, including Rayleigh scattering, Brillouin scattering and Raman scattering. FIG. 3a shows an example spectrum 300 of a scattered signal received from the optical fibre 1000. The horizontal axis in FIG. 3a represents a frequency shift relative to the pulsed test signal. As can be seen, the scattered signal includes a Rayleigh scattering component 302 at 0 Hz, which results from elastic scattering of the test signal. The scattered signal further includes a Brillouin scattering component 304 which is frequency-shifted relative to the test signal, and which results from inelastic Brillouin scattering of the test signal. The frequency shift associated with Brillouin scattering is typically between 8 GHZ and 12 GHZ. In the example shown, the Brillouin frequency shift is around 11 GHz. In more detail, the Brillouin scattering component includes a Stokes component 304a whose frequency is down-shifted relative to the test signal, and an Anti-Stokes component 304b whose frequency is up-shifted relative to the test signal. The scattered signal also includes a Raman scattering component 306 which is frequency-shifted relative to the test signal, and which results from inelastic Raman scattering of the test signal. The frequency shift associated with Raman scattering is typically between 10 and 15 THz. In the example shown, the Raman frequency shift is around 13 THz. In more detail, the Raman scattering component includes a Stokes component 306a whose frequency is down-shifted relative to the test signal, and an Anti-Stokes component 306b whose frequency is up-shifted relative to the test signal. Herein, when reference is made to the Brillouin scattering component, this may refer to the Stokes and/or Anti-Stokes component of the Brillouin scattering component.

In the combined DAS and DSTS mode, the second IQ modulator 24 in the local oscillator stage 16 is configured to generate a local oscillator signal having a first local oscillator component which is not frequency-shifted, and a second local oscillator component which is frequency-shifted relative to the light source 12. To achieve this, the second IQ modulator 24 is driven as a partial single side band suppressed carrier modulator (SSB-SC), which is non-perfectly biased so as not to fully suppress the original light signal. Thus, the IQ modulator 24 outputs a frequency-shifted copy of the light signal, as well as a copy of the original light signal which may be partially suppressed. The frequency shift $F_2$ applied to the second local oscillator component may be controlled by a drive signal that is applied to the IQ modulator 24. Typically, the frequency shift applied to the second local oscillator component may be between 8 GHz and 12 GHz. For example, the frequency shift may be around 10 GHZ.

Figure 3B:
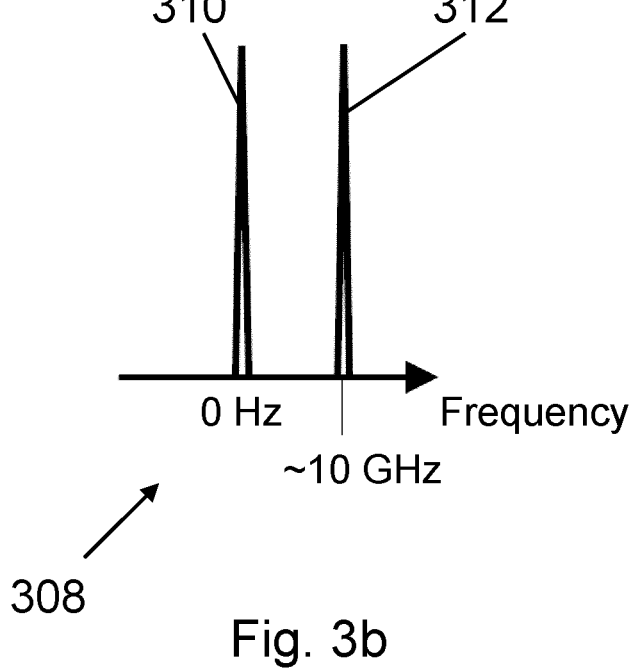
FIG. 3b is an example spectrum of a local oscillator signal that can be generated by the systems of FIGS. 1a and 1b.

FIG. 3b shows an example spectrum 308 of the local oscillator signal generated by the local oscillator stage 16. The horizontal axis in FIG. 3b represents a frequency shift relative to the frequency of the light signal provided by the light source 12. As can be seen, the local oscillator signal includes a first local oscillator component 310 which is at 0 Hz, i.e. which is not frequency-shifted. The local oscillator signal further includes a second local oscillator component 312 which is shifted upwards in frequency. In the example shown, the second local oscillator component 304 is shifted by about 10 GHZ, however other frequency shifts in the ranges mentioned above can be selected. It should also be noted that, as the IQ modulator 24 is a complex field modulator, a negative frequency shift can be applied to the second local oscillator component instead of a positive frequency shift.

Due to the presence of the two components in the local oscillator signal (FIG. 3b), and the multiple scattering components in the scattered signal (FIG. 3a), interference between the local oscillator signal and the test signal will produce a series of components at different frequencies, corresponding to frequency differences between components of the local oscillator signal and the scattered signal. As a result, the output signals from the square law detectors 40a, 40b in the detector stage 28 will include a first component at a first frequency corresponding to a frequency difference between the first local oscillator component and the Rayleigh scattering component, and a second component at a second frequency corresponding to a frequency difference between the second local oscillator component and the Brillouin scattering component. The first component of the output signal relates to Rayleigh scattering, and thus corresponds to a DAS signal. In the example shown in FIGS. 3a and 3b, and where a frequency shift $F_1$ is applied to the test signal, the DAS signal will be at a frequency $F_1$, whilst the DSTS signal will be at around 1 GHZ (i.e. the frequency difference between the 11 GHz Brillouin scattering component and the 10 GHz second local oscillator component).

Therefore, the DAS signal can be processed in accordance with known techniques, in order to extract differential strain and/or temperature information about the optical fibre 1000. For example, the DAS signal can be processed in accordance with techniques disclosed the applicant's earlier application published as GB 2588177 A. The second component of the output signal relates to Brillouin scattering, and thus corresponds to a DSTS signal. The DSTS signal can be processed in accordance with known techniques, in order to extract values of the strain and/or temperature in the optical fibre 1000. For example, strain and temperature measurements using Brillouin scattering are disclosed in "Distributed fibre sensing using microwave heterodyne detection of spontaneous Brillouin backscatter" by S. M. Maughan (PHD thesis, University of Southampton).

In this manner, both DAS and DSTS measurements may be performed simultaneously using the system 10.

In an alternative measurement mode, instead of generating a local oscillator signal having two components as shown in FIG. 3b, where the zero shifted component is utilised as the DAS LO and the positively shifted component mixes down higher frequency Brillouin anti-stokes component, the transmitted test signal may be generated so as to have two components in a similar manner as illustrated in FIG. 3b. However now whereas the first technique required a positive frequency shift to measure the anti-stokes component the TX field requires a negative shift to perform the same task. This may result in analogous interference components in the output signal from the square law detectors, enabling simultaneous DAS and DSTS measurements. In more detail, the test signal may be generated so as to have a pair of pulses, e.g. where the first pulse has a frequency shift $F_1$ for obtaining the DAS measurement, and where the second pulse is frequency shifted by −10 GHz for measuring the Anti-Stokes-Brillouin scattering or +10 GHz for Stokes. Note that here a negative frequency shift may be used in this approach for measuring the Brillouin scattering, whereas a positive frequency shift was used in the approach above where the local oscillator is provided with two components. Such a test signal with a pair of pulses at different frequencies would yield a DAS measurement at the frequency $F_1$, and the Stokes or anti-Stokes components of the Brillouin scattering would be at around 1 GHz. A benefit of using separate pulses of the test signal for DAS and DSTS measurements is that the launch power and pulse width for the DAS and DSTS measurements does not have to be the same, such that characteristics of the two pulses can be optimised for their respective measurements.

In a further measurement mode, the controller may be configured to perform a DSTS measurement on its own. In such a case, the launch stage 14 and the local oscillator stage 16 may be operated in a similar manner to that described above, except that the second IQ modulator 24 may be driven as a suppressed carrier single sideband modulator, to fully suppress the original carrier (i.e. to suppress component 310 shown in FIG. 3b). The DSTS signal may then be obtained as described above, by looking at the component of the output signal at the difference frequency between the Brillouin scattering component and the frequency-shifted local oscillator component.

In yet a further measurement mode, the controller is configured to perform DAS and DSTS measurements on alternate pulses. Specifically, the controller may be configured to alternate back and forth over time between a first step for performing the DAS measurement and a second step for performing the DSTS measurement. In the first step the IQ modulators 21a, 21b generate a pulse of a first test signal, whilst in the second step the IQ modulators 21a, 21b generate a pulse of a second test signal. Thus, the IQ modulators 21a, 21b generate a sequence of pulses which alternate between the first test signal and the second test signal. The alternation between the first test signal and the second test signal may be controlled via a drive signal which is fed to the IQ modulators 21a, 21b. The first test signal and the second test signal may have different properties, such that each one may be specifically tailored for the detection of Rayleigh scattering and Brillouin scattering, respectively. In particular, properties of the first and second test signals such as pulse duration, pulse amplitude, and/or frequency shift may be adjusted to enhance detection of the corresponding scattering mechanism.

Spread Spectrum Test Signal Pulse

In a further measurement mode for performing DAS, the IQ modulators 21a, 21b in the launch stage 14 may be controlled by the controller to generate a spread spectrum test pulse. A spread spectrum signal, corresponds to a signal which is spread in the frequency domain. That is, the instantaneous frequency of the signal changes over time and over the duration of the signal, such that the instantaneous frequency is modulated with what may be referred to as an instantaneous frequency function. As an example, the instantaneous frequency function may be a linearly increasing function (i.e. so that the instantaneous frequency increases linearly over the course of the pulse), or the instantaneous frequency function may be a non-linearly increasing function. For instance, a non-linearly increasing instantaneous frequency function may be a parabolic function, such that the instantaneous frequency increases parabolically over the course of the pulse. In another example, a non-linearly increasing instantaneous frequency function may be hyperbolic.

Advantageously, using a spread spectrum test signal pulse can yield an increase in signal-to-noise (SNR) of the DAS measurement, This also enables the operational range of the system to be improved without a reduction in spatial resolution. Examples of using spread spectrum pulse techniques are disclosed in the applicant's earlier patent application GB2113095.0.

Determination of Noise Characteristics

The controller of the system 10 may further be configured to determine noise characteristics of the light source 12, using the output signal from the reference interferometer 17. In particular, the reference interferometer 17 is unbalanced such that the light signal passing along the delayed path is delayed relative to the light signal passing along the undelayed path. When the light signals from the two paths interfere on the detector 48, the signal generated is related to the phase noise of the light source 12 differentiated by the fixed delay in the delayed path. The phase noise of the light source 12 can thus be determined from the output signal of the detector 48.

The determined phase noise can be used to compensate for the light source's phase noise, to improve a quality of the measurement. For example, the phase noise can be digitally removed from measurement data obtained from the detector stage 28, e.g. for measurements such as DAS where phase is being measured. Additionally or alternatively, the determined phase noise can be used in a feedback loop for controlling the light source 12, to reduce or minimise the phase noise of the light source. For instance, the system may be configured to control a temperature of the light source and/or a current supplied to the light source based on the determined phase noise, to reduce or minimise the phase noise of the light source. Temperature control of the light source 12 may enable low frequency corrections to the phase noise, whilst current control may enable faster corrections.

The invention claimed is:

1. An optical measurement system comprising:
   a coherent light source configured to generate a light signal;
   a launch stage configured to receive the light signal from the light source and generate a test signal and launch the test signal along an optical path, wherein the launch stage includes a first IQ modulator for controlling the test signal;
   a local oscillator stage configured to generate a local oscillator signal, wherein local oscillator stage comprises a second IQ modulator for controlling the local oscillator signal; and
   a detector stage configured to receive the local oscillator signal from the local oscillator stage and a scattered signal from the optical path, and interfere the local oscillator signal with the scattered signal,
   wherein the optical measurement system is implemented with one or more photonic integrated circuits.

2. The optical measurement system according to claim 1, further comprising a polarising beam splitter configured to split the light signal received by the launch stage into a first polarisation state and a second polarisation state, and wherein the first IQ modulator includes a pair of IQ modulators for controlling the light signal in the first polarisation state and the second polarisation state, respectively.

3. The optical measurement system according to claim 1, wherein the first IQ modulator and/or the second IQ modulator respectively comprises a first branch and a second branch with a phase delay introduced between the first branch and the second branch, and wherein each of the first branch and the second branch comprises a respective amplitude and phase modulator.

4. The optical measurement system according to claim 1, further comprising a reference interferometer connected to receive a portion of the light signal from the light source, wherein the reference interferometer is configured to interfere a first portion of the received light signal with a second, delayed portion of the received light signal.

5. The optical measurement system according to claim 4, further configured to determine a phase noise of the light source based on the interference of the first portion and the second portion of the received light signal in the reference interferometer.

6. The optical measurement system according to claim 1, wherein the detector stage comprises a polarising beam splitter arranged to split a first one of the local oscillator signal and the scattered signal into a first polarisation state and a second polarisation state, and wherein the detector stage is configured to interfere a second one of the local oscillator signal and the scattered signal with each of the first and second polarisation states.

7. The optical measurement system according to claim 1, wherein the detector stage comprises a plurality of input channels, each input channel configured to receive a respective scattered signal, and wherein the detector stage is configured to separately interfere the local oscillator signal with each one of the respective scattered signals.

8. The optical measurement system according to claim 1, further comprising a controller configured to control the first IQ modulator and the second IQ modulator.

9. The optical measurement system according to claim 8, wherein the controller is configured to control the first IQ modulator to vary a frequency of the test signal over time, and/or the controller is configured to control the second IQ modulator to vary a frequency of the local oscillator over time.

10. The optical measurement system according to claim 8, wherein:
    the controller is configured to control a frequency of the test signal by driving the first IQ modulator as a single sideband modulator; and/or
    the controller is configured to control a frequency of the local oscillator by driving the second IQ modulator as a single sideband modulator.

11. The optical measurement system according to claim 8, wherein:
    the controller comprises two or more selectable measurement modes, and a memory arranged to store, for each of the two or more measurement modes, a respective set of control parameters for the first IQ modulator and the second IQ modulator; and
    the controller is configured to control the first IQ modulator and the second IQ modulator in accordance with the set of control parameters associated with a selected one of the two or more measurement modes.

12. The optical measurement system according to claim 1, wherein the coherent light source is implemented on a separate photonic integrated circuit from the launch stage, local oscillator stage and the detector stage.

13. The optical measurement system according to claim 9, wherein:
    the controller is configured to control a frequency of the test signal by driving the first IQ modulator as a single sideband modulator; and/or the controller is configured to control a frequency of the local oscillator by driving the second IQ modulator as a single sideband modulator.

14. The optical measurement system according to claim 13, wherein:

the controller comprises two or more selectable measurement modes, and a memory arranged to store, for each of the two or more measurement modes, a respective set of control parameters for the first IQ modulator and the second IQ modulator; and the controller is configured to control the first IQ modulator and the second IQ modulator in accordance with the set of control parameters associated with a selected one of the two or more measurement modes.

15. The optical measurement system according to claim 9, wherein:

the controller comprises two or more selectable measurement modes, and a memory arranged to store, for each of the two or more measurement modes, a respective set of control parameters for the first IQ modulator and the second IQ modulator; and the controller is configured to control the first IQ modulator and the second IQ modulator in accordance with the set of control parameters associated with a selected one of the two or more measurement modes.

16. The optical measurement system according to claim 10, wherein:

the controller comprises two or more selectable measurement modes, and a memory arranged to store, for each of the two or more measurement modes, a respective set of control parameters for the first IQ modulator and the second IQ modulator; and the controller is configured to control the first IQ modulator and the second IQ modulator in accordance with the set of control parameters associated with a selected one of the two or more measurement modes.

\* \* \* \* \*